(12) United States Patent
Martinchick et al.

(10) Patent No.: US 9,849,753 B2
(45) Date of Patent: Dec. 26, 2017

(54) HEATING SYSTEM FOR AN AUTOMOTIVE VEHICLE

(75) Inventors: Matthew J. Martinchick, Farmington, MI (US); Mark D. Nemesh, Troy, MI (US); Sowmyalatha Jayaraman, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1666 days.

(21) Appl. No.: 12/121,832

(22) Filed: May 16, 2008

(65) Prior Publication Data

US 2009/0283604 A1 Nov. 19, 2009

(51) Int. Cl.
*B60H 1/04* (2006.01)
*B60H 1/03* (2006.01)
*B60H 1/00* (2006.01)

(52) U.S. Cl.
CPC ......... *B60H 1/034* (2013.01); *B60H 1/00392* (2013.01)

(58) Field of Classification Search
USPC ................. 237/12.3 B, 28, 12.3 R; 219/208; 62/244; 236/34.5; 123/41.08, 41.09, 123/41.1
See application file for complete search history.

(56) References Cited

U.S. PATENT DOCUMENTS

| | | | | |
|---|---|---|---|---|
| 2,158,388 A | * | 5/1939 | Taylor | 137/583 |
| 2,231,501 A | * | 2/1941 | Jepertinger | 237/12.3 B |
| 2,841,127 A | * | 7/1958 | Baster | 123/41.1 |
| 3,122,319 A | * | 2/1964 | Friedl et al. | 237/8 A |
| 4,010,895 A | * | 3/1977 | Kofink et al. | 237/12.3 C |
| 4,192,274 A | * | 3/1980 | Damon | 123/142.5 R |
| 4,580,531 A | * | 4/1986 | N'Guyen | 123/41.1 |
| 5,048,752 A | * | 9/1991 | Hintennach et al. | 237/2 A |
| 5,174,254 A | * | 12/1992 | Humburg | 123/142.5 R |

(Continued)

FOREIGN PATENT DOCUMENTS

| | | |
|---|---|---|
| DE | 3447182 A1 | 6/1986 |
| DE | 3718697 A1 | 12/1987 |

(Continued)

OTHER PUBLICATIONS

Teruyuki et al, JP11-208250 A English machine translation, Mar. 8, 1999.*

*Primary Examiner* — Alissa Tompkins
*Assistant Examiner* — Phillip E Decker
(74) *Attorney, Agent, or Firm* — Quinn IP Law

(57) ABSTRACT

A heating system for a vehicle having a power plant with a power plant coolant loop, and a method of operation, is disclosed. The heating system may include a HVAC module and a heater core coolant loop. The HVAC module includes a heater core. The heater core coolant loop includes a three-way valve having an inlet engaging the heater core for receiving a coolant, a first outlet that directs the coolant back into the heater core coolant loop, and a second outlet that directs the coolant into the power plant; a coolant pump for pumping the coolant through the heater core coolant loop; and a coolant heater located upstream of the heater core that selectively heats coolant flowing therethrough. Also, a coolant line receives the coolant from a heater core outlet of the power plant and directs the coolant into the heater core coolant loop.

8 Claims, 3 Drawing Sheets

(56) References Cited

U.S. PATENT DOCUMENTS

| | | | |
|---|---|---|---|
| 5,529,112 A * | 6/1996 | King et al. | 165/11.1 |
| 5,730,089 A * | 3/1998 | Morikawa et al. | 123/41.14 |
| 5,967,101 A * | 10/1999 | Roth et al. | 123/41.29 |
| 6,383,672 B1 * | 5/2002 | Fujita | 429/434 |
| 6,454,180 B2 * | 9/2002 | Matsunaga et al. | 237/12.3 B |
| 6,732,940 B2 * | 5/2004 | Enander et al. | 237/2 A |
| 6,971,440 B1 * | 12/2005 | Beck et al. | 165/42 |
| 7,063,138 B2 * | 6/2006 | Salim et al. | 165/202 |
| 7,270,902 B2 * | 9/2007 | Suzuki | 429/443 |
| 7,287,581 B2 * | 10/2007 | Ziehr et al. | 165/202 |
| 7,614,368 B2 * | 11/2009 | Gehres et al. | 123/41.08 |
| 2003/0022034 A1 * | 1/2003 | Suzuki | 429/13 |
| 2003/0127528 A1 * | 7/2003 | Sabhapathy et al. | 237/12.3 B |
| 2003/0217559 A1 | 11/2003 | Ieda et al. | |
| 2004/0050944 A1 * | 3/2004 | Matsunaga et al. | 237/12.3 B |
| 2004/0253495 A1 * | 12/2004 | LaVen | 429/23 |
| 2005/0022983 A1 * | 2/2005 | Kadle et al. | 165/202 |
| 2005/0039878 A1 * | 2/2005 | Meyer et al. | 165/42 |
| 2005/0167169 A1 * | 8/2005 | Gering et al. | 180/65.2 |
| 2005/0274814 A1 * | 12/2005 | Schwartz et al. | 237/28 |
| 2006/0086816 A1 * | 4/2006 | Schwartz et al. | 237/12.3 R |
| 2007/0063062 A1 * | 3/2007 | Hernandez et al. | 237/12.3 B |
| 2007/0272174 A1 * | 11/2007 | Szalony et al. | 123/41.14 |
| 2008/0060592 A1 * | 3/2008 | Mehring et al. | 123/41.72 |
| 2009/0139472 A1 * | 6/2009 | Gehres et al. | 123/41.08 |
| 2010/0012295 A1 * | 1/2010 | Nemesh et al. | 165/104.19 |
| 2010/0230505 A1 * | 9/2010 | Ribadeneira et al. | 237/5 |
| 2013/0019819 A1 * | 1/2013 | Dye et al. | 123/41.09 |

FOREIGN PATENT DOCUMENTS

| | | | | |
|---|---|---|---|---|
| DE | 3621837 A1 | 1/1988 | | |
| DE | 4115138 A1 | 11/1992 | | |
| JP | 2001315524 A * | 11/2001 | | B60H 1/03 |
| JP | 2006004703 A * | 1/2006 | | |

* cited by examiner

HEATING SYSTEM FOR AN AUTOMOTIVE VEHICLE

BACKGROUND OF INVENTION

The present invention relates generally to heating, ventilation and air conditioning (HVAC) systems for vehicles.

The HVAC systems used in conventional vehicles are typically powered by the engine, which is continuously running, and so are not impacted by the power drain on a battery pack. Such systems are based upon the fact that a conventional (non-hybrid) vehicle's engine coolant temperature is controlled to a somewhat constant temperature, using an engine thermostat, and that the heater core coolant flow rate varies with engine speed. These HVAC systems when operating in heating modes typically adjust the position of a temperature door to achieve the desired temperature of the air flowing into a passenger compartment.

However, for plug-in hybrids & electric vehicles, an important vehicle performance objective is vehicle range in the pure electric-vehicle mode. Such extended range electric automotive vehicles use a motor, powered by a battery, for moving the vehicle, with an engine or fuel cell used as a kind of on-board generator to recharge the battery pack. Some types of hybrid vehicles (such as plug-in hybrid vehicles) also operate for extended periods in electric only modes. In electric vehicle mode, there is no engine heat rejection and so battery pack energy is consumed in order to power the accessories. The electric only driving range of automotive vehicles, with battery powered electric motors providing the motive force, can be greatly reduced by vehicle electric accessory loads. Some of the highest electric accessory loads are used to provide heat to the passenger compartment of the vehicle for windshield defrost/defog and occupant comfort. Thus, minimizing the electric power consumption for HVAC systems can greatly improve the electric only driving range of these vehicles, as well as sometimes improve the total driving range of the vehicles.

Moreover, for fuel cell vehicles, the maximum fuel cell coolant temperature is limited to a lower level than with an internal combustion engine, so supplemental heat may be required to provide the desired heat to the passenger compartment for defrost and warming functions—especially when the vehicle is operating in low ambient air temperature conditions.

SUMMARY OF INVENTION

An embodiment contemplates a heating system for a vehicle having a power plant with a power plant coolant loop. The heating system may comprise a HVAC module and a heater core coolant loop. The HVAC module includes a heater core. The heater core coolant loop includes a three-way valve having an inlet engaging the heater core for receiving a coolant therefrom, a first outlet that selectively directs the coolant back into the heater core coolant loop, and a second outlet that selectively directs the coolant into the power plant; a coolant pump for pumping the coolant through the heater core coolant loop; and a coolant heater located upstream of the heater core in the heater core coolant loop that selectively heats coolant flowing therethrough. Also, a coolant line receives the coolant from a heater core outlet of the power plant and directs the coolant into the heater core coolant loop.

An embodiment contemplates an automotive vehicle comprising: an engine compartment having a power plant and a power plant coolant loop located therein, with the power plant coolant loop configured to direct a coolant flow out of and into the power plant, and the power plant including a heater core outlet; a passenger compartment has a HVAC module located therein, with the HVAC module including a heater core; a coolant heater configured to selectively heat a coolant just prior to the coolant entering the heater core; a coolant pump configured to selectively pump a coolant through the coolant heater and the heater core; a three-way valve having an inlet operatively engaging the heater core for receiving the coolant therefrom, a first outlet configured to selectively direct the coolant toward the coolant heater, and a second outlet configured to selectively direct the coolant into the power plant in fluid communication with the power plant coolant loop; and a coolant line for directing the coolant from the heater core outlet of the power plant toward the coolant heater.

An embodiment contemplates a method of operating a heating system in a vehicle, the method comprising the steps of: determining if a power plant is operating; determining if a temperature of a coolant in a power plant coolant loop is above a predetermined temperature threshold; actuating a valve to isolate a heater core coolant loop from a power plant coolant loop, activating a coolant pump in the heater core coolant loop and activating a coolant heater in the heater core coolant loop to heat the coolant in the heater core coolant loop before the coolant flows through a heater core, if the temperature in the power plant coolant loop is not above the predetermined temperature threshold; and actuating the valve to direct the coolant from the heater core coolant loop into the power plant coolant loop and the coolant from the power plant coolant loop into the heater core coolant loop if the temperature in the power plant coolant loop is at or above the predetermined temperature threshold.

An advantage of an embodiment is that electrical power consumption is minimized during cabin heating and defrost/defogging when the vehicle is in electric vehicle mode, during initial stages of engine-on operation (engine warm-up), and during hybrid engine operation. Supplemental heat can also be provided to fuel cell vehicles to provide the desired defrost/defog and passenger compartment warming functions. Also, electric compressor power consumption may be reduced by stopping engine coolant flow to the heater core during air conditioning operating modes.

DETAILED DESCRIPTION

Figure 1:
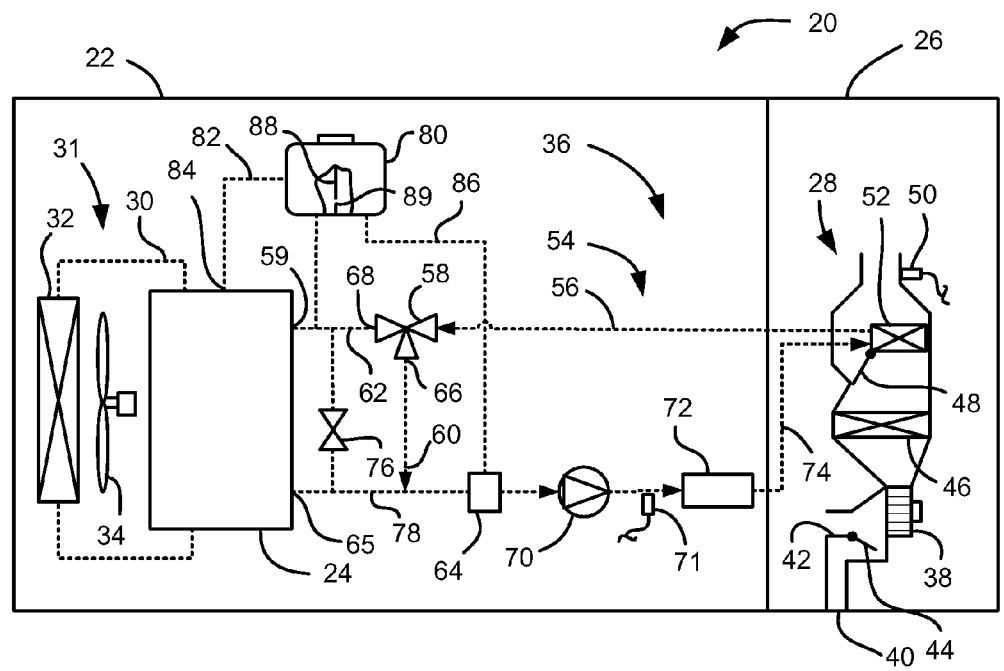
FIG. 1 is a schematic diagram of a vehicle having a heating system according to a first embodiment.
Figure 2:
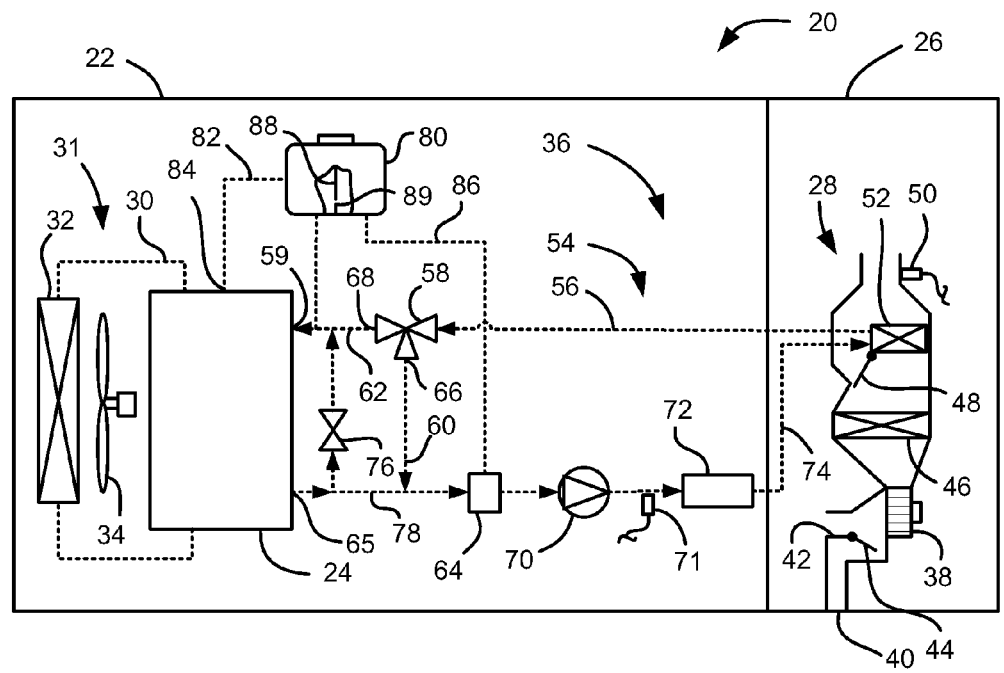
FIG. 2 is a view similar to FIG. 1, but illustrating a different mode of operation.
Figure 3:
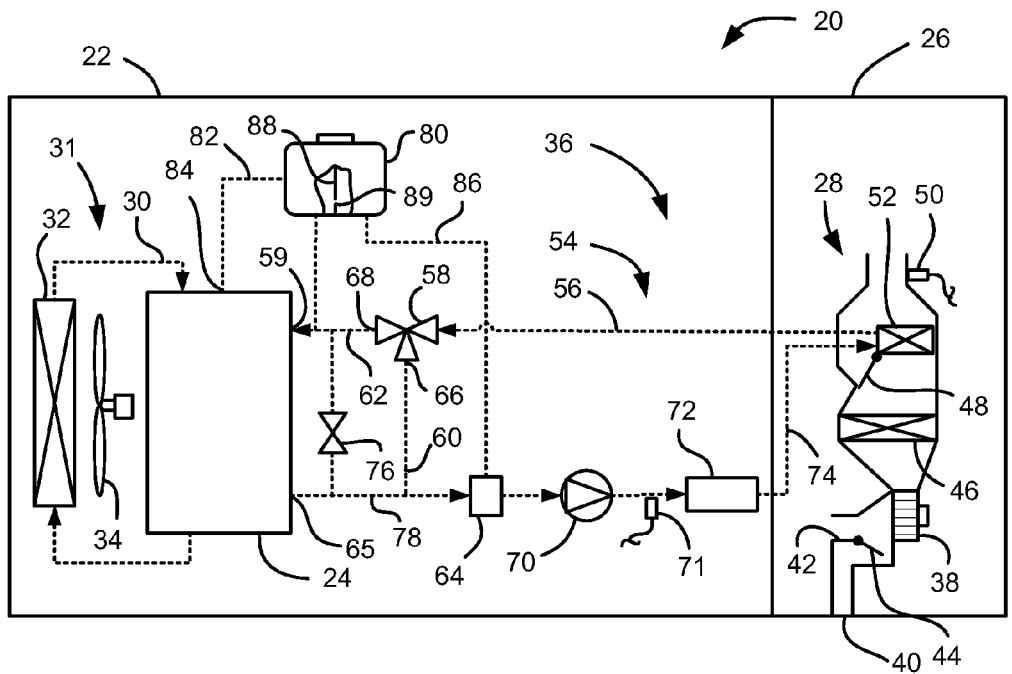
FIG. 3 is a view similar to FIG. 1, but illustrating a different mode of operation.

Referring to FIGS. 1-3, a vehicle, indicated generally at 20, is shown. The vehicle 20 may be an extended range electric vehicle. The vehicle 20 includes an engine compartment 22, within which is mounted a power plant 24, and a passenger compartment 26, within which is a heating, ventilation and air conditioning (HVAC) module 28. The power plant 24 may be, for example, an internal combustion engine or a fuel cell. The power plant 24 may have coolant lines 30 extending to a radiator 32, which may be located adjacent to a cooling fan 34. The coolant lines 30 and radiator 32, along with the power plant 24, form a power plant coolant loop 31. Coolant lines, as disclosed herein, may be tubes, hoses or other means of directing fluid from one location to another.

The HVAC module 28 forms a part of a heating system 36 for the vehicle 20 (as well as part of an air conditioning system, not shown) and includes a blower 38 that draws air into the HVAC module 28 through a recirculation flow path 40 and a fresh air path 42, with a fresh/recirculation door 44 determining the air mix from each path 40, 42. An evaporator 46 extends across the module 28 downstream of the blower 38, with a temperature door 48 just downstream from the evaporator 46. An air temperature sensor 50 measures the temperature of the air leaving the module 28. Between the temperature door 48 and the air temperature sensor 50 is a heater core 52, which is part of the heating system 36. The temperature door 48 is movable to selectively vary the percentage of the air flowing through or around the heater core 52. One will note that, even though this heating system 36 is employed in a vehicle with a non-conventional power system, the HVAC module 28 may be the same as one employed in a conventional vehicle. This allows for re-use of existing, non-hybrid vehicle, automatic climate control HVAC module temperature door adjustment controls as well as re-use of non-hybrid vehicle HVAC modules. Thus, the cost and complexity for vehicles having conventional and optional non-conventional power train systems may be reduced.

The heating system 36 also includes a heater core coolant loop 54, with a coolant line 56 extending from an outlet of the heater core 52 to an inlet to a three-way valve 58. The three-way valve 58 also includes a first outlet 66 directing coolant to a coolant line 60 of the heater core coolant loop 54 and a second outlet 68 directing coolant to a coolant line 62 that directs coolant to a heater core inlet 59 of the power plant 24. The heater core coolant loop 54 also includes an air separator 64, which can receive coolant from a heater core outlet 65 of the power plant 24 or the first outlet 66 of the three-way valve 58 and direct it toward a coolant pump 70. The coolant pump 70, which may be electrically driven, pumps the coolant through the coolant loop 54 and directs the coolant to a coolant heater 72. The coolant heater 72 may be a high voltage, positive temperature coefficient (PTC) or resistive heater that can provide a high rate of heat input to coolant flowing through it. A coolant inlet temperature sensor 71 may be located adjacent to the coolant heater 72 to measure the temperature of coolant entering the coolant heater 72. The outlet of the coolant heater 72 is connected, via a coolant line 74, to an input to the heater core 52, thus completing the heater core coolant loop 54. One will note that the high voltage heating components of the heating system 36 can be located outside of the passenger compartment 26, thus avoiding the added complexity incurred when locating a high voltage component in a passenger compartment.

A power plant external bypass valve 76 extends between the coolant line 62 extending from the power plant heater core inlet 59 and a coolant line 78 extending from the power plant heater core outlet 65. Also, a coolant surge tank 80 is connected to a coolant line 82 leading to an engine vent 84, the coolant line 62, and to a coolant line 86 leading to the air separator 64. An internal divider wall 88 is located in the surge tank 80 and includes a small bleed hole 89.

The operation of the embodiments of FIGS. 1-3 will now be discussed. Depending upon the various operating conditions of the power plant 24 and temperature of the coolant, the heater core coolant loop 54 can be selectively isolated from or operated with the power plant coolant loop 31. The arrowheads on the coolant lines indicate the direction of flow of the coolant for that particular mode.

A first heating mode of operation is illustrated in FIG. 1 and occurs when the power plant 24 is not operating and the coolant in the power plant coolant loop 31 is not sufficiently warm to provide adequate heating to the passenger compartment 26. In this mode, no coolant is flowing in the power plant coolant loop 31 and the three-way valve 58 is actuated to direct coolant coming from the heater core 52 through the coolant line 60 to the air separator 64. When the coolant flows through the air separator 64, air bubbles in the coolant flow stream are separated out into the coolant surge tank 80. The pump 70 is activated to pump the coolant through the heater core coolant loop 54, and the coolant heater 72 is activated to heat the coolant as the coolant flows through it. The temperature sensor 71, measuring the temperature of the coolant entering the coolant heater 72, allows the coolant heater 72 heat input to be adjusted to account for the temperature of the coolant entering the heater 72. The heated coolant then flows through the heater core 52. The temperature door 48 is actuated to direct all of the air pushed through the HVAC module 28 by the blower 38 through the heater core 52 (rather than having some air bypass the heater core). The air flowing through the heater core 52 absorbs heat from the coolant before flowing out to defrost/defog windows and warm the passenger compartment 26. The air temperature sensor 50 may be employed to determine if air exiting the HVAC module 28 is at the desired temperature. Also, the speed of the coolant pump 70 can be controlled to optimize the coolant flow rate through the heater core 52 in order to maximize heater core efficiency.

A second heating mode of operation is illustrated in FIG. 2 and occurs when the power plant 24 is operating and the coolant in the power plant coolant loop 31 is not warm enough to provide substantial heat to the heater core 52. In this mode, the three-way valve 58, coolant pump 70 and coolant heater 72 operate similar to the first heating mode, with the heater core coolant loop 54 isolated from the power plant coolant loop 31. Thus, the coolant heater 72 still provides heat to the coolant before it flows into the heater core 52. In addition, the external bypass valve 76 is opened, allowing coolant in the power plant to circulate from the heater core outlet 65 back to the heater core inlet 59, without flowing through the heater core coolant loop 54.

As the coolant warms up in the coolant loops 31, 54, some coolant may flow into the coolant surge tank 80 to account for thermal expansion. The bleed hole 89 in the internal divider wall 88 prevents power plant vent bleed during power plant warm-up. And, if the three-way valve 58 has a small amount of leakage, the bleed hole 89 allows coolant to re-enter the heater core coolant loop 54—otherwise, the pump 70 might end up pumping out all of the coolant from the heater core coolant loop 54. The divider wall 88 with the bleed hole 89 also allows somewhat for separate levels of coolant on either side of the divider wall 88.

A third heating mode of operation is illustrated in FIG. 3 and occurs when the power plant 24 is operating and the coolant in the power plant coolant loop 31 is warm enough to provide substantial heat to the heater core 52. In this mode, the three-way valve 58 is actuated to direct coolant from the heater core 52 to the heater core inlet 59 of the power plant 24, and the bypass valve 76 is closed so that coolant flowing from the heater core outlet 65 of the power plant 24 flows through the coolant line 78 to the air separator 64 in the heater core coolant loop 54. The coolant pump 70 may be activated if the coolant flow from the power plant 24 is not sufficient by itself. Also, the coolant heater 72 may be activated to provide supplemental coolant heating if the power plant 24 is not providing sufficient coolant heating by itself. Supplemental coolant heating may be needed, in particular, when the power plant 24 is a fuel cell since not as much heat rejection is available for coolant heating (as compared to an internal combustion engine power plant).

Even after the power plant 24 ceases operation and the vehicle is in an electric vehicle mode, while the coolant is still warm enough to provide the necessary heat to the heater core, the three-way valve 58 and bypass valve 76 may remain in their positions for the third mode of operation. This allows for additional heat to be taken from the coolant, allowing the coolant heater 72 to draw less power from the battery pack to heat the coolant. The vehicle 20 may then remain in the electric vehicle operating mode for a longer time before having to re-start the power plant 24.

In addition to passenger compartment heating modes, the heating system 36 has the flexibility to stop coolant flow through the heater core 52 while the power plant 24 and the vehicle air conditioning system are operating. The bypass valve 76 is opened, the three-way valve 58 is actuated to the same position as in the first two heating modes, and the coolant pump 70 is turned off. This eliminates heater scrub, thus improving air conditioning performance.

Moreover, if a high power vehicle charger (not shown) is employed for recharging the battery pack (not shown) in a vehicle having an internal combustion engine for the power plant 24, then the coolant heater 72 may be used to pre-heat the coolant. The pre-heated coolant may be directed into the power plant 24, when started, possibly reducing emissions at start-up.

Figure 4:
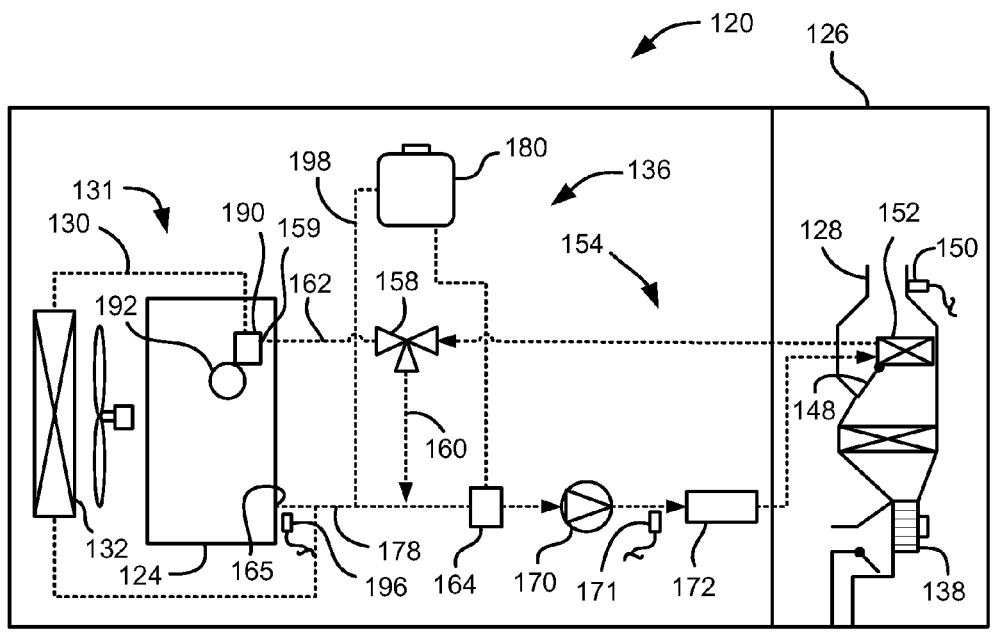
FIG. 4 is a schematic diagram of a vehicle having a heating system according to a second embodiment.
Figure 5:
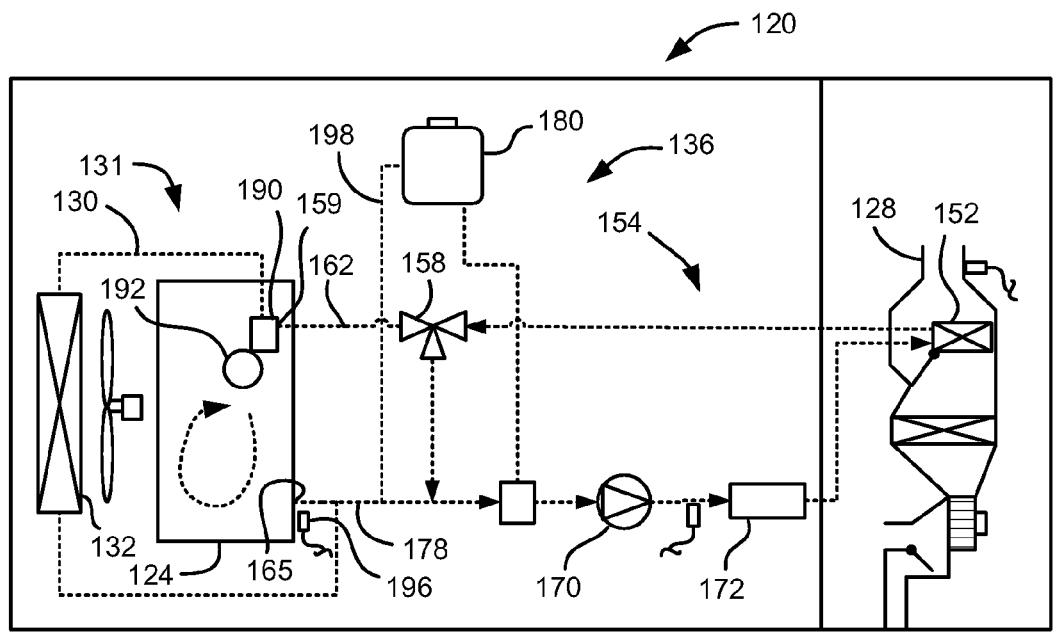
FIG. 5 is a view similar to FIG. 4, but illustrating a different mode of operation.
Figure 6:
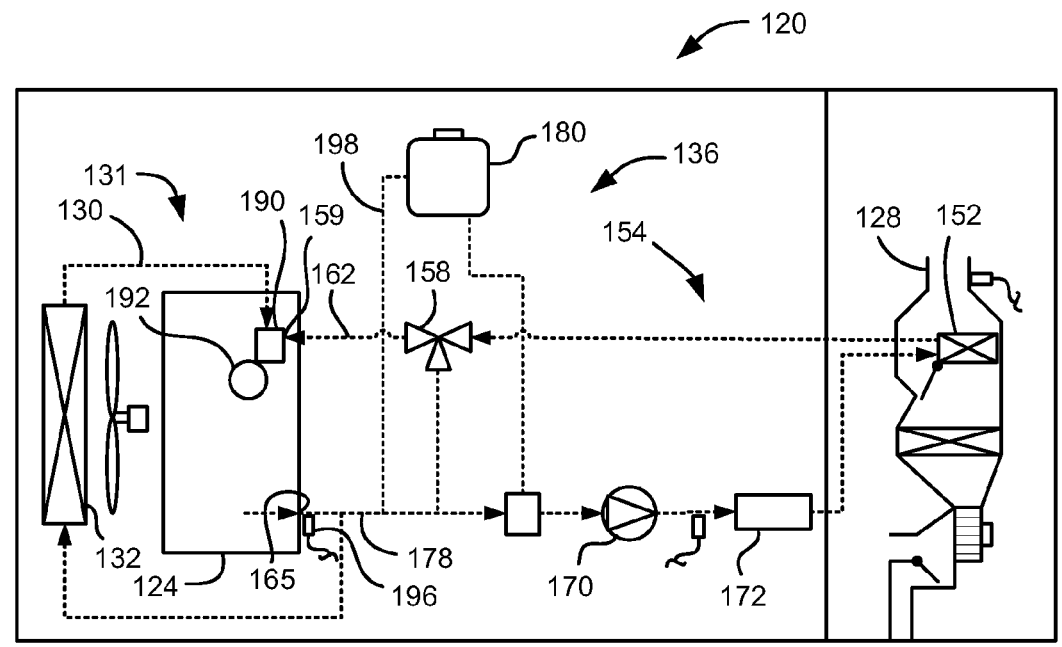
FIG. 6 is a view similar to FIG. 4, but illustrating a different mode of operation.

FIGS. 4-6 illustrate a second embodiment. Since this embodiment is similar to the first, similar element numbers will be used for similar elements, but employing 100-series numbers. The vehicle 120 still includes a heater core coolant loop 154, a HVAC module 128, and a power plant 124, similar to the first embodiment. The power plant coolant loop 131, however, is changed somewhat from the first embodiment and the bypass valve is eliminated.

The power plant coolant loop 131 includes a thermostat 190 that connects, via coolant line 162, to the three-way valve 158. The thermostat 190 interacts with a power plant water pump 192, allowing the coolant flowing into the water pump 192 to be selectively received from the coolant lines 130 in the power plant coolant loop 131 or from the coolant line 162. Also, a coolant temperature sensor 196 may be located at the heater core outlet 165 to measure the temperature of the coolant leaving the power plant 124. Another coolant line 198 connects the coolant line 178 with the coolant surge tank 180. The coolant line 130 leading to an input to the radiator 132 connects to the coolant line 178 extending from the heater core outlet 165 of the power plant 124.

The three different heating modes of operation of the heating system 136 will now be discussed. The arrowheads on the coolant lines indicate the direction of flow of the coolant for that particular mode.

The first heating mode is illustrated in FIG. 4 and occurs when the power plant 124 is not operating and the coolant in the power plant coolant loop 131 is not sufficiently warm to provide adequate heating to the passenger compartment 126. In this mode, no coolant is flowing in the power plant coolant loop 131 and the three-way valve 158 is actuated to direct coolant coming from the heater core 152 through the coolant line 160 to the air separator 164 (thus isolating the heater core coolant loop 154 from the power plant coolant loop 131). The pump 170 is activated to pump the coolant through the heater core coolant loop 154, and the coolant heater 172 is activated to heat the coolant as the coolant flows through it. The temperature sensor 171, measuring the temperature of the coolant entering the coolant heater 172, allows the coolant heater 172 heat input to be adjusted to account for the temperature of the coolant entering the heater 172. Other factors for determining the power input to the coolant heater 172 may be the ambient air temperature and the speed of the blower 138. The heated coolant then flows through the heater core 152. The temperature door 148 is actuated to direct all of the air pushed through the HVAC module 128 by the blower 138 through the heater core 152 (rather than having some air bypass the heater core)— although minor temperature adjustments may be made by actuating the temperature door 148. The air flowing through the heater core 152 will absorb heat from the coolant before flowing out to defrost/defog windows and warm the passenger compartment 126. The air temperature sensor 150 may be employed to determine if air exiting the HVAC module 128 is at the desired temperature. Also, the speed of the coolant pump 170 can be controlled to optimize the coolant flow rate through the heater core 152 in order to maximize heater core efficiency.

The second heating mode is illustrated in FIG. 5 and occurs when the power plant 124 is operating and the coolant in the power plant coolant loop 131 is not warm enough to provide substantial heat to the heater core 152. In this mode, the three-way valve 158, coolant pump 170 and coolant heater 172 operate similar to the first mode, with the heater core coolant loop 154 isolated from the power plant coolant loop 131. Thus, the coolant heater 172 still provides heat to the coolant before it flows into the heater core 152. In addition, the thermostat 190 is positioned to block coolant flow through the power plant coolant loop 131 while allowing coolant in the power plant 124 to circulate internally (indicated by the circular arrow in the power plant 124).

The third heating mode is illustrated in FIG. 6 and occurs when the power plant 124 is operating and the coolant in the power plant coolant loop 131 is warm enough to provide substantial heat to the heater core 152. In this mode, the three-way valve 158 is actuated to direct coolant from the heater core 152 to the heater core inlet 159 of the power plant 124. The thermostat 190 is positioned to allow the coolant to flow through the power plant coolant loop 131 and to flow through the heater core outlet 165 of the power plant 124 to the heater core coolant loop 154. The coolant pump 170 may be activated if the coolant flow from the power plant 124 is not sufficient by itself. Also, the coolant heater 172 may be activated to provide supplemental coolant heating if the power plant 124 is not providing sufficient coolant heating by itself—for example, at very low ambient temperatures.

In addition to passenger compartment heating modes, the heating system 136 has the flexibility to stop coolant flow through the heater core 152 while the power plant 124 and the vehicle air conditioning system are operating. The three-way valve 158 is actuated to the same position as in the first two heating modes, and the coolant pump 170 is turned off. This eliminates heater scrub, thus improving air conditioning performance.

While certain embodiments of the present invention have been described in detail, those familiar with the art to which this invention relates will recognize various alternative designs and embodiments for practicing the invention as defined by the following claims.

What is claimed is:

1. A method of operating a heating system in a vehicle, the method comprising the steps of:
   (a) determining if a power plant is operating;
   (b) determining if a temperature of a coolant in a power plant coolant loop is above a predetermined temperature threshold;
   (c) when the temperature in the power plant coolant loop is not above the predetermined temperature threshold and the power plant is operating, actuating a valve to isolate a heater core coolant loop from the power plant coolant loop, activating a coolant pump in the heater core coolant loop and activating a coolant heater in the heater core coolant loop to heat the coolant in the heater core coolant loop before the coolant flows through a heater core in a first direction; and
   (d) actuating the valve to direct the coolant from the heater core coolant loop into the power plant coolant loop and the coolant from the power plant coolant loop into the heater core coolant loop and through the heater core in the first direction when the temperature in the power plant coolant loop is at or above the predetermined temperature threshold.

2. The method of claim 1 wherein step (d) is further defined by activating the coolant heater if an ambient temperature is below a predetermined ambient temperature threshold.

3. The method of claim 1 wherein step (d) is further defined by closing a bypass valve, mounted directly downstream from a power plant heater core outlet and upstream from a power plant heater core inlet, to block a flow of the coolant directly between the power plant heater core outlet and the power plant heater core inlet if the temperature in the power plant coolant loop is at or above the predetermined temperature threshold.

4. The method of claim 1 wherein step (c) is further defined by actuating a temperature door to cause essentially all air flowing through an HVAC module to flow through the heater core if the temperature in the power plant coolant loop is not above the predetermined temperature threshold.

5. The method of claim 1 wherein step (d) is further defined by activating the coolant pump if the power plant is not operating and the temperature in the power plant coolant loop is at or above the predetermined temperature threshold, with the coolant flowing between the heater core coolant loop and the power plant coolant loop.

6. The method of claim 1 further comprising the step of (e) separating air bubbles from the coolant as the coolant flows through the heater core coolant loop.

7. The method of claim 1 wherein step (d) is further defined by actuating the valve to direct the coolant from the heater core coolant loop into the power plant coolant loop and the coolant from the power plant coolant loop into the heater core coolant loop only if the temperature in the power plant coolant loop is at or above the predetermined temperature threshold.

8. The method of claim 1 further comprising (e) if the temperature in the power plant coolant loop is not above the predetermined temperature threshold and the power plant is not operating, actuating a valve to isolate a heater core coolant loop from a power plant coolant loop, activating a coolant pump in the heater core coolant loop and activating a coolant heater in the heater core coolant loop to heat the coolant in the heater core coolant loop before the coolant flows through a heater core, in the first direction.

* * * * *